United States Patent [19]
Kneser et al.

[11] Patent Number: 6,157,912
[45] Date of Patent: *Dec. 5, 2000

[54] SPEECH RECOGNITION METHOD WITH LANGUAGE MODEL ADAPTATION

[75] Inventors: Reinhard Kneser; Jochen Peters; Dietrich Klakow, all of Aachen, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/033,202

[22] Filed: Mar. 2, 1998

[30] Foreign Application Priority Data

Feb. 28, 1997 [DE] Germany ............... 197 08 183

[51] Int. Cl.$^7$ ........................................ G10L 9/00
[52] U.S. Cl. ................ 704/270; 704/255; 704/256
[58] Field of Search ........................ 704/270, 255, 704/256

[56] References Cited

U.S. PATENT DOCUMENTS

| | | | |
|---|---|---|---|
| 5,384,892 | 1/1995 | Strong | 704/243 |
| 5,390,279 | 2/1995 | Strong | 704/200 |
| 5,613,036 | 3/1997 | Strong | 704/243 |
| 5,651,096 | 7/1997 | Pallakoff | 704/275 |
| 5,680,511 | 10/1997 | Baker et al. | 704/256 |
| 5,899,973 | 5/1995 | Bandara et al. | 704/256 |

OTHER PUBLICATIONS

R. Kneser et al: "Semantic Clustering for Adaptive Language Modeling" 1997 IEEE International Conference on Acoustics, Speech, and Signal Processing (Cat. No. 97CB36052), 1997 IEEE International Confernece on Acoustics, Speech and Signal Processing, Munich, Germany, Apr. 21–24, 1997, pp. 779–782, vol. 2, XPoo2089828, ISBN 0–81–86–7919–0, 1997, Los Alamitos, CA, USA, IEEE Comput. Soc. Press, USA.

"On the Dynamic Adaption of Stochastic Language Models", by Reinhard Kneser et al, IEEE, 1993, pp. II–586–II–589.

"A Cache–Based Natural Language Model for Speech Recognition", by Roland Kuhn et al, IEE Transactions Pattern Analysis and Machine Intelligence, Vol. 12, No. 6, Jun. 1990.

*Primary Examiner*—David R. Hudspeth
*Assistant Examiner*—Daniel Abebe

[57] ABSTRACT

Language models which take into account the probabilities of word sequences are used in speech recognition, in particular in the recognition of fluently spoken language with a wide vocabulary, in order to increase the recognition reliability. These models are obtained from comparatively large quantities of text and accordingly represent values which were averaged over several texts. This means, however, that the language model is not well adapted to peculiarities of a special text. To achieve such an adaptation of a given language model to a special text on the basis of only a short text fragment, according to the invention, it is suggested that first the unigram language model is adapted with the short text and, in dependence thereon, the M-gram language model is subsequently adapted. A method is described for adapting the unigram language model values which automatically carries out a subdivision of the words into semantic classes.

17 Claims, No Drawings

SPEECH RECOGNITION METHOD WITH LANGUAGE MODEL ADAPTATION

FIELD OF THE INVENTION

The invention relates to the automatic recognition of speech in which a language model with language model values is used, which values are determined from a comparatively long training text, while an adaptation of the language model on the basis of in particular comparatively short text portions is carried out for certain cases, in particular for certain types of texts.

A series of test values is obtained from a speech signal in the automatic speech recognition process, which test values are compared with stored reference values, sequences of reference values representing words of a given vocabulary. Scores are derived from the comparison and are combined with language model values at word boundaries. These language model values represent the probabilities that given word sequences of limited length are present; they have been obtained from a comparatively large quantity of training texts, which may also be formed by written texts. Long-term changes in the use of language, for example subject matter or style, can accordingly not be taken into account with these language model values. Since the quality of the adaptation of the language model values has a considerable influence on the reliability of the speech recognition, it is desirable to adapt the language model values as well as possible to the given text by means of a small quantity of updated text. This adaptation may take place during the process of recognizing a given text or alternatively subsequent to the recognition of part of a text, after recognition errors have been manually corrected. The adaptation may alternatively also take place in that the special text is subjected to the recognition process once and adapted language model values are derived therefrom, which are then used for a renewed recognition of the same text.

DESCRIPTION OF PRIOR ART

A method known from IEEE Trans. on Pattern Analysis and Machine Intelligence, vol. 12, June 1990, pp. 570 to 583, for creating an adaptive language model is the so-called language model cache. Relative frequencies of occurrence $N_a(w)/N_a$ are calculated here, $N_a(w)$ being the frequency of occurrence of the word w in the adaptation material and $N_a$ being the total number of words in the adaptation material. The adaptive cache language model is now calculated as follows $$P_a(w|h) := \lambda\, P_s(w|h) + (1-\lambda)\frac{N_a(w)}{N_a}$$

in which the interpolation parameter $\lambda$ is either fixedly programmed or is so determined for each adaptation that the adaptation material is described as well as possible, as is known from Proc. ICASSP, Minneapolis USA, vol. II, April 1993, pp. 585 to 593. The adaptation of the language model values to an updated text achieved thereby, however, is not ideal.

SUMMARY OF THE INVENTION

It is an object of the invention to provide a method of adapting language model values which enables a good adaptation of the language model values to peculiarities of a speech signal, such as subject matter or style, also if this speech signal is short.

According to the invention, this object is achieved in that unigram language model values obtained from a large quantity of texts are adapted on the basis of an updated speech signal, and adapted M-gram language model values are obtained by means of said adapted unigram language model values. So the M-gram language model values are not directly changed, but first the unigram language model values are adapted and the M-gram values are subsequently changed on the basis of the former adaptation. This renders it possible to adapt the M-gram values already on the basis of a small quantity of spoken text data in which a major portion of the word sequences on which the M-gram values are based has not yet occurred. A substantially larger quantity of the individual words of the vocabulary will occur in a short text, so that the unigram language model can be more thoroughly adapted in the case of a short spoken text. An essential discovery here is that a good adaptation of the M-gram values can take place already by means of these adapted unigram values, for example, the frequency of occurrence of the sequence of various preceding words in the short spoken text not being taken into account. The language model values do not represent exact values any way, they are no more than estimates of probabilities of words or word sequences being present, and the adapted language model values then represent no more than improved estimation values.

Various possibilities exist for the adaptation of the unigram language model values, a particularly favorable possibility being based on a classification according to which each word of the vocabulary is unequivocally assigned to a given semantic class. This classification can be achieved automatically when different training speech signals are available which originate, for example, from different subject fields and comprise different styles of speech or language. This will be explained in more detail further below.

DETAILED DESCRIPTION OF THE PREFERRED EMBODIMENTS

The adaptive unigram language model values $P_a$ may be realized as linear combinations of several unigram components $P_i(w)$:

$$P_a(w) = \sum_i \lambda_i P_i(w) \text{ with } \sum_i \lambda_i = 1$$

The adaptivity arises either from the fact that the interpolation parameters $\lambda_i$ are adaptively determined or from the fact that one or several components themselves are adaptive.

The following components are suitable:

- a static unigram $P_s(w)$ estimated on the basis of the entire training text.
- a static unigram $P_D(w)$ estimated on the basis of selected texts belonging to a given subject matter D.
- a cache language model component $$P_c(w) := \frac{N_a(w)}{N_a}$$

a semantic language model component $$P_K(w) := P - s(w|K(w)) \frac{N_a(K(w))}{N_a}$$

in which $N_a(K(w))$ represents the frequency of occurrence of the class K to which the word w belongs, and $P_s(w|K(w))$ is the conditional probability of a word, given its class, estimated on the basis of the entire training material. The starting point here is that each word w belongs to exactly one semantic class K(w).

The automatic generation of semantic classes is based on the situation that a text body is available for training, subdivided into individual text portions, so-called articles, which show a thematic coherence. $N_i$ then indicates the number of words in the $i^{th}$ article, and $N_i(w)$ and $N(w)$ represent the frequencies of occurrence of the word w in the $i^{th}$ article and in the entire body of texts, respectively. Given a certain classification K, in which each word w is assigned to exactly one semantic class K(w), the article frequencies of occurrence are $$N_i(a; K) := \sum_{w:K(w)=a} N_i(w)$$

The class frequency of occurrence N(a;K) for the entire body of texts is formed in an analogous manner. If the classification is obvious from the context, it is left out in an abridged representation method.

The following logarithmic probability can be calculated for any classification, given this nomenclature:

$$f_1(K) = \sum_i \sum_w N_i(w) \log \frac{N_i(K(w))}{N_i} \frac{N(w)}{N(K(w))}$$

The present method is based on the procedure of finding a classification which maximizes this probability. Since the terms which are independent of the classification take no part in this maximizing process, one may as well maximize the following function:

$$f_2(K) = \sum_i \sum_w N_i(w) \log \frac{N_i(K(w))}{N(K(w))}$$

The assignment of the individual words to classes is iteratively changed on the basis of an initial classification of the vocabulary into semantic classes such that the function value $f_2(K)$ is increased at each iterative step. The following steps are carried out consecutively for each word w in the vocabulary:

1. that class which maximizes the criterion $f_2(K)$, while the classification of the other words remains the same, is determined for the word w.
2. if the class found sub 1. differs from the original one, the word is assigned to this new class, and the classification is changed accordingly.

After all words in the vocabulary have been thus evaluated, a new run through the vocabulary is started. The process is ended when a given number of runs has been completed or when no words were assigned to new classes in a run. A fixed classification has been achieved thereby for all words of the vocabulary used for the adaptation in question of the unigram language model values.

A static M-gram model is presupposed for the adaptation of the M-gram language model values, which model estimates a conditional probability $P_s(w|h)$ for historic word sequences h consisting of words immediately preceding the word w up to a maximum length of M-1 words. This language model comprises in particular also a static unigram model $P_s(w)$. There are various methods now for calculating an adaptive M-gram model $P_a(w|h)$ from the adapted unigram model $P_a(w)$. The following quantity is first defined for this purpose:

$$\alpha(w) := \frac{P_a(w)}{P_s(w)}$$

alternative 1:

$$P_a(w|h) = \alpha(w) P_s(w|h)$$

alternative 2:

$$P_a(w|h) = \frac{\alpha(w)}{z(h)} P_s(w|h)$$

in which:

$$z(h) : \sum_V \alpha(v) P_s(v|h)$$

alternative 3:

It is additionally assumed that a quantity T of word sequences of the maximum length M has actually been observed in a training text. For a word sequence h=($w_1 \ldots w_i$), furthermore, the word sequence shortened by one word $\hat{h}=(w_2 \ldots w_i)$ is given. This results in the adaptive probabilities, i.e. the adapted language model values in a recursive manner as follows:

$$P_a(w|h) = \begin{cases} \frac{\alpha(w)}{z_1(h)} P_s(w|h) & \text{if } (h, w) \in T \\ \frac{1}{z_2(h)} P_a(w|\hat{h}) & \text{else} \end{cases}$$

The expressions $z_1(h)$ and $z_2(h)$ here mean:

$$z_1(h) = \frac{\sum_{w:(h,w)\in T} \alpha(w) P_s(w|h)}{\sum_{w:(h,w)\in T} P_s(w|h)}$$

$$z_2(h) = \frac{1 - \sum_{w:(h,w)\in T} P_a(w|\hat{h})}{1 - \sum_{w:(h,w)\in T} P_a(w|h)}$$

A favorable adapted M-gram language model can be obtained in this manner.

A conventional computer loaded with a suitable program may be used for carrying out the described method. This program may be present on a data carrier which is inserted into the computer for the purpose of loading the program.

We claim:

1. A method of adapting a language model with language model values for automatic speech recognition in which test values are derived from a speech signal and are compared with reference values which define a vocabulary, and in which scores are derived which are combined with language model values at word boundaries, the language model values depending on a probability that a given word of the vocabulary will occur in dependence on at least one preceding word, said method comprising the steps of:

- determining a basic language model with unigram and M-gram basic language model values on the basis of training data, with M=2, 3, . . . ;
- obtaining adapted unigram language model values from the unigram basic language model values on the basis of a speech signal which differs from the training data; and
- determining adapted M-gram language model values in accordance with the adapted unigram language model values.

2. A method as claimed in claim 1, wherein the basic language model is determined on the basis of different training speech signals, and each word of the vocabulary is assigned to at least one of a plurality of classes such that a degree of similarity based upon a number of observations of this word in the training speech signals reaches a maximum, and wherein the unigram basic language model value of each word within a class is adapted in accordance with a further speech signal, taking into account a frequency of occurrence of all words of this class and a frequency of occurrence of all words of all classes in the further speech signal, and the M-gram language model values are adapted in accordance with the adapted unigram language model values for recognition of the further speech signal.

3. A memory medium including code, which when executed, performs the method as claimed in claim 2.

4. An apparatus for adapting a language model with language model values for an automatic speech recognition in which test values are derived from a speech signal and are compared with reference values which define a vocabulary, and in which scores are derived which are combined with language model values at word boundaries, the language model values depending on a probability that a given word of the vocabulary will occur in dependence on at least one preceding word, said apparatus comprising:

- a memory; and
- a processor, coupled to the memory, which executes process steps stored in the memory so as to perform the method as claimed in claim 2.

5. A method as claimed in claim 2, wherein the classification takes place in that a number of classes is preprogrammed, each word is consecutively assigned to each class, and the following equation is calculated for each assignment of the word to each class K:

$$f_2(K) = \sum_i \sum_w N_i(w) \log \frac{N_i(K(w))}{N(K(w))}$$

in which $N_i(w)$ represents the number of observations of the word w in each of the various training speech signals i, $N_i(K(w))$ represents the number of observations of all words already assigned to the class K in each of the various training speech signals i, and $N(K(w))$ represents the number of obervations of all words already assigned to the class K in all training speech signals, and in that each word is assigned to a class for which the value $f_2(K)$ is a maximum.

6. A method as claimed in claim 5, wherein said steps are repeated after all words have been assigned to classes until a given criterion has been met.

7. A memory medium including code, which when executed, performs the method as claimed in claim 5.

8. A method as claimed in claim 1, wherein an adaptive unigram language model value of each word is formed from a combination of several components, among which at least the following component:

$$P_K(w) := P_s(w|K(w)) \frac{N_a(K(w))}{N_a}$$

in which $P_s(W/K(w))$ is the conditional probability for a word, given its class, in accordance with the total training speech signals, $N_a(K(w))$ is the number of the observations of all words in the class K in the further speech signal, and $N_a$ is the number of observations of all words of all classes.

9. An apparatus for adapting a language model with language model values for an automatic speech recognition in which test values are derived from a speech signal and are compared with reference values which define a vocabulary, and in which scores are derived which are combined with language model values at word boundaries, the language model values depending on a probability that a given word of the vocabulary will occur in dependence on at least one preceding word, said apparatus comprising:

- a memory; and
- a processor, coupled to the memory, which executes process steps stored in the memory so as to perform the method as claimed in claim 1.

10. A memory medium including code, which when executed, performs the method as claimed in claim 1.

11. A method of adapting a language model relating to a vocabulary of words for a speech recognition system, comprising the steps of:

- calculating a first language model and a second language model in accordance with training speech data, the second language model being based in part upon the first language model;
- obtaining adapted first language model values from the first language model in accordance with adapted speech data which includes less speech data than the training speech data; and
- determining adapted second language model values in accordance with the adapted first language model values,
- wherein the first language model includes unigram language model values and the second language model includes M-gram language model values, where M is an integer greater than one.

12. The method according to claim 11, wherein each word of the vocabulary is initially assigned to one of a plurality of classes, and wherein said obtaining step includes adapting the unigram basic language model value of each word within a class in accordance with a frequency of occurrence of all words of this class and a frequency of occurrence of all words of all classes in the adapted speech data.

13. The method according to claim 12, wherein the plurality of classes are based upon subdivisions of the training speech data which show a thematic coherence.

14. The method according to claim 12, wherein said obtaining step includes determining for each word a classification in accordance a calculation that maximises a predetermined probability.

15. A speech recognition apparatus, comprising,

- a vocabulary of words;
- means for calculating a first language model and a second language model in accordance a comparison of training speech data and reference data values related ot the vocabulary of words;
- means for iteratively obtaining adapted first language model values from the first language model in accordance with adapted speech data which includes less speech data than the training speech data; and means for determining adapted second language model values in accordance with the adapted first language model values, wherein the first language mofel includes unigram language model values and the second language model includes M-gram language model values, where M is an integer greater than one.

16. The apparatus according to claim 15, wherein said means for calculating initially assigns each word of the vocabulary to one of a plurality of classes, and wherein said means for obtaining adapts the unigram basic language model value of each word within a class in accordance with a frequency of occurrence of all words of this class and a frequency of occurrence of all words of all classes in the adapted speech data.

17. The apparatus according to claim 16, wherein the plurality of classes are based upon subdivisions of the training speech data which show a thematic coherence.

* * * * *